United States Patent [19]

Simpkins

[11] Patent Number: 4,519,257

[45] Date of Patent: May 28, 1985

[54] ELECTRONIC FLOW METER FOR MEASURING FLOW OF BULK SOLIDS PNEUMATICALLY CONVEYED THROUGH A HOSE

[76] Inventor: Otto K. Simpkins, 4308 Glen Eden Dr., Nashville, Tenn. 37205

[21] Appl. No.: 517,456

[22] Filed: Jul. 26, 1983

[51] Int. Cl.³ .............................................. G01F 1/74
[52] U.S. Cl. .................... 73/861.04; 356/442
[58] Field of Search ............. 73/28, 861.04, 32; 250/223 R, 564, 565, 573; 356/442

[56] References Cited

U.S. PATENT DOCUMENTS

| | | | |
|---|---|---|---|
| 1,851,215 | 3/1932 | Schunemann | 250/223 R X |
| 3,033,036 | 5/1962 | Leisey | 73/861.04 |
| 3,800,147 | 3/1974 | Shea et al. | 356/442 X |
| 3,987,660 | 10/1976 | Pelanne | 356/432 X |
| 4,349,734 | 9/1982 | DiGuiseppi | 73/861.04 X |

Primary Examiner—Charles A. Ruehl
Attorney, Agent, or Firm—Cushman, Darby & Cushman

[57] ABSTRACT

An electronic flow meter utilizes a light source for directing a beam of light onto a light responsive sensing device, such as a photocell. As solids flow through a hose, they interrupt the light beam, changing the light intensity impinging on the photocell. This change in light intensity alters the output voltage of the photocell in direct proportion to the flow of solids through the hose. The changes in voltage are digitized and transmitted to a computer which utilizes this information in calculations indicating the weight of the solid that has passed through the hose.

6 Claims, 5 Drawing Figures

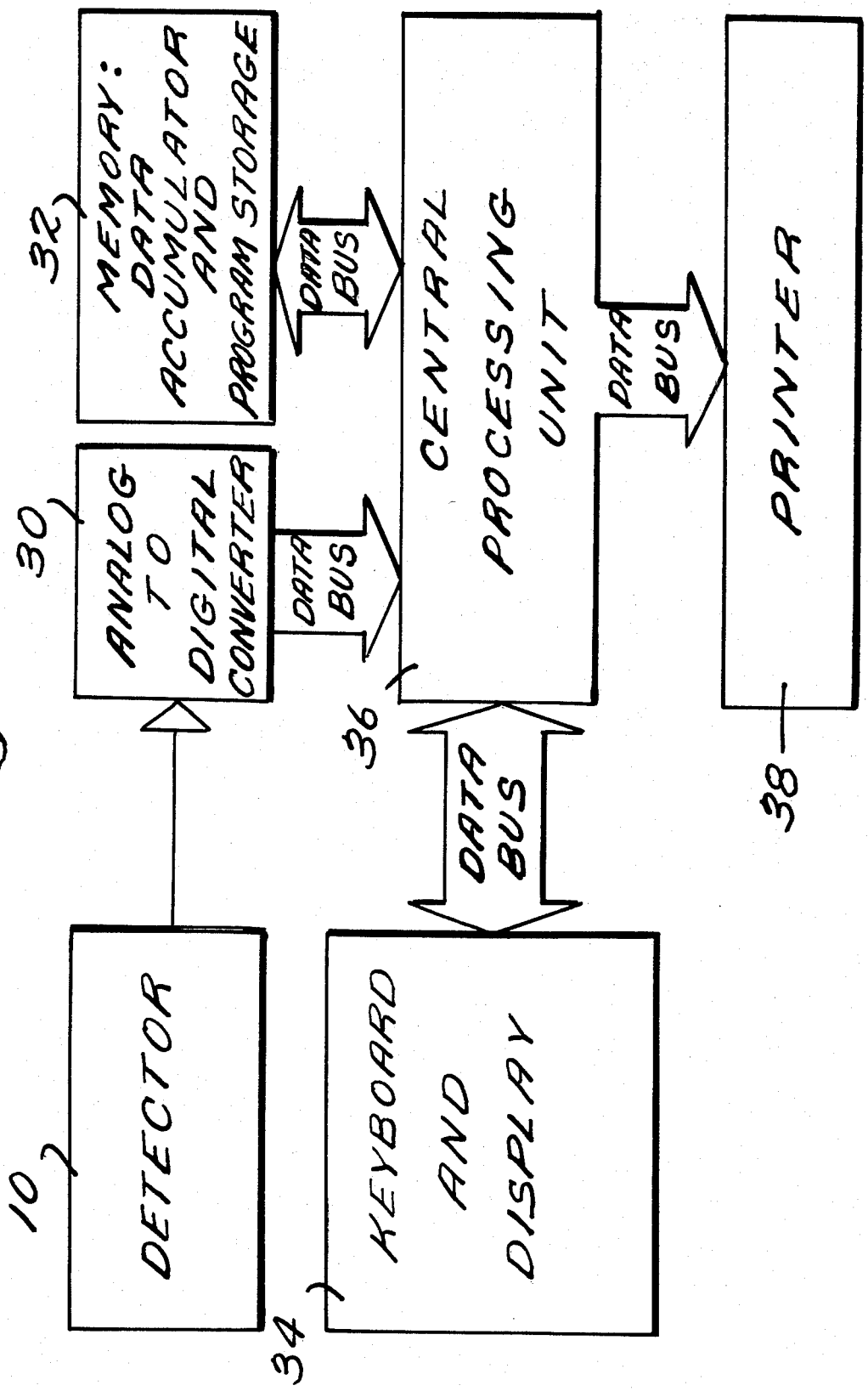

ELECTRONIC FLOW METER FOR MEASURING FLOW OF BULK SOLIDS PNEUMATICALLY CONVEYED THROUGH A HOSE

BACKGROUND OF THE INVENTION

The present invention relates to measurement of the flow of solids pneumatically conveyed through a hose and particularly, to electronic flow meters for measuring the flow of insulation passing through the hose of an insulation blowing machine.

For installing blown insulation, the industry has established recommended guidelines for insulation density per square foot of area covered. The present method of measuring the amount of insulation blown is to count the number of standard-sized bags consumed in the blowing operation, and the consumer relies on the contractor to use the proper number of bags. With this method of measurement, however, the industry has suffered a fraud problem. This problem is documented in the INSULATION PROFESSIONAL, Spring, 1983, a publication by Owens-Corning Fiberglas Corporation, and in the ICAA NEWS, June 1983, a publication by the Insulation Contractors Association of America. The problem is characterized by some contractors puffing the insulation with air and thinly spreading it so that fewer bags of insulation per square foot are installed than the industry guidelines require. After the insulation has been installed, it is impossible to measure the amount that was actually blown without removing and weighing it.

Various flow measuring devices are known for sensing characteristics of materials passing through a conduit. For example, U.S. Pat. No. 4,231,262, issued to Richard H. Boll et al on Nov. 4, 1980, teaches the use of a flow meter for measuring the flow of particulate solids by taking differential pressure measurements along points of a venturi through which the solids are funneled; and U.S. Pat. No. 3,800,147, issued to James J. Shea et al on Mar. 26, 1974, discloses the use of a turbidimeter with automatic color compensation for sensing low turbidity concentrations in fluids of various colors. However, neither of these devices is capable of measuring the flow of bulk solids, such as loose fill insulation.

SUMMARY OF THE INVENTION

The present invention measures the weight of insulation actually passing through the hose of an insulation blowing machine. More particularly, a flow detector is placed in the hose, the detector comprising a light source and a light responsive sensing device. As solids flow past the detector, they interrupt a light beam emanating from the light source, thus changing the output voltage of the sensing device in direct proportion to the flow of solids through the hose. The changes in voltage are sampled and digitized for transmittal to a computer which determines the weight of the bulk solid flowing through the hose during a particular period of time.

DETAILED DESCRIPTION OF THE INVENTION

The present invention now will be described in further detail with reference to the accompanying drawings wherein:

FIG. 5 is a block diagram of an electronic flow meter according to the invention.

Figure 1:
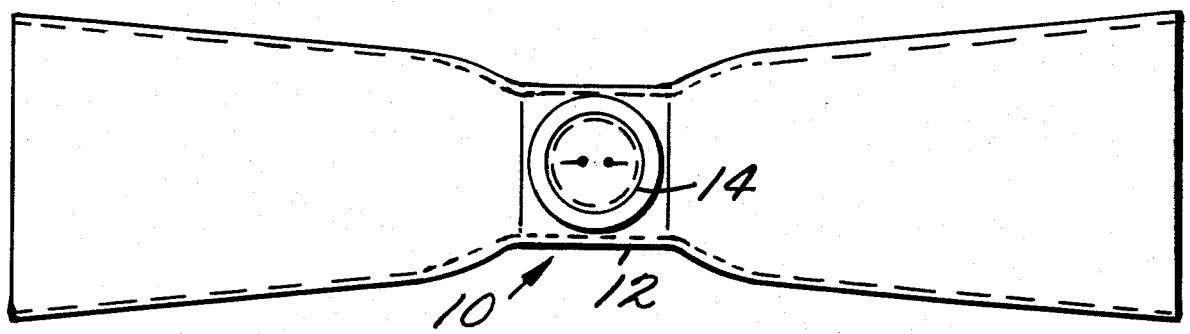
FIG. 1 is a side elevational view of an electronic flow detector portion of the invention.
Figure 2:
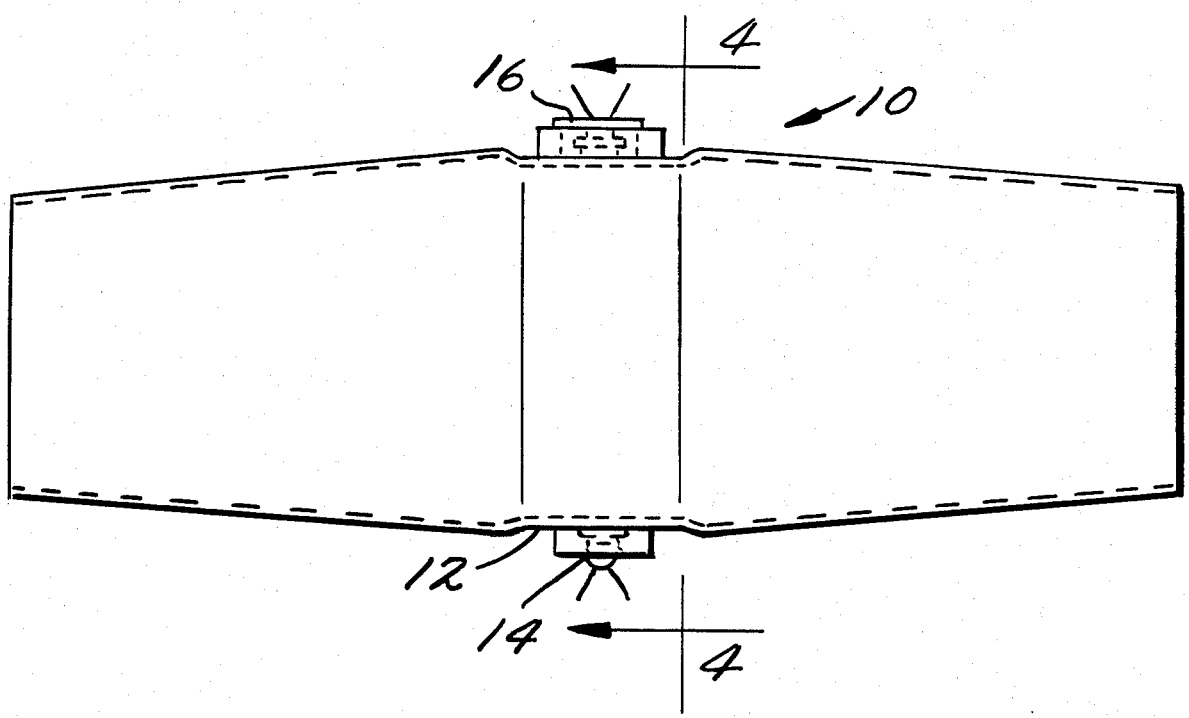
FIG. 2 is a top plan view thereof.
Figure 4:
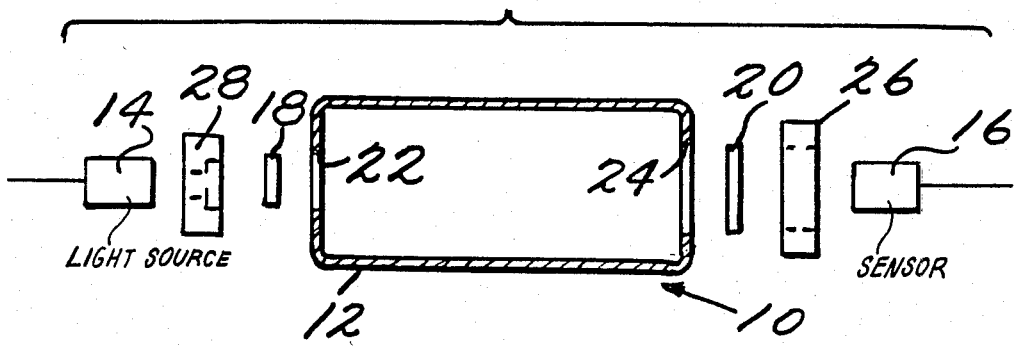
FIG. 4 is an exploded sectional diagrammatical view thereof taken along line 4—4 of FIG. 2.
Figure 3:
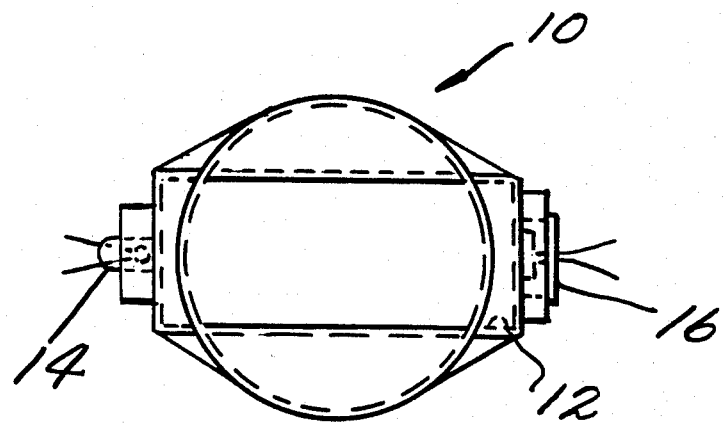
FIG. 3 is an end view thereof.

Referring to FIGS. 1-4, a preferred embodiment of a bulk solid flow detector 10 is illustrated. The detector 10 includes a tube (preferably metal) through which the bulk solids pass when the tube is joined to the hose of an insulation blowing machine (not shown). The tube is circular at its ends (FIG. 3) and has a substantially rectangular cross-section (FIG. 4) at its central portion 12. A light source 14 and a light responsive sensing device 16 are positioned on opposite sides of portion 12 in such a manner that a beam of light from source 14 is directed towards the sensing device 16. In the embodiment illustrated, the sensing device 16 is a photocell. However, it will be appreciated that other types of known sensors may be employed, such as those utilizing fiber optics.

As solids flow past the detector, the amount of light from source 14 impinging on sensor 16 varies, thus changing the sensor's output voltage. The voltage changes are sampled and digitized and then are transmitted to a computer where the information is used as data indicative of the weight of bulk solid material flowing past the detector 10. The manner in which the computer functions will be described in detail hereinafter.

The tube portion 12 of the detector is formed with a rectangular cross-section for the reasons:

(1) that it provides flat surfaces for the light source 14 and the sensor 16;

(2) that it concentrates the flowing solids within the beam of light between the source and the sensor; and (3) that it deflects the bulk solid material away from the lenses of the sensor and the light source thereby avoiding the scratching of said lenses which otherwise would decrease the accuracy of the detector.

The formed area of the tube is a function of the tube diameter. It is dimensioned to minimize the difference in cross-sectional area from that of the tube's ends while concentrating the flowing material within the light beam to the sensor 16.

The tube's diameter at its ends is determined by the volume capability of the conveying system being used, and it preferably is the same as the diameter of the hose to which it is attached. The standard size hose diameter used in blowing insulation is three inches.

The assembly of the bulk solid flow measuring detector 10 (FIG. 4) begins with the introduction of flat glass lenses 18 and 20 into apertures 22 and 24, respectively, on opposite sides of portion 12 of the detector. The lenses are mounted flush to the internal surface of portion 12. A sensor holder 26 is mounted over lens 20, and sensor 16 is attached to holder 26. A light source holder 28 is mounted over the lens 18, and light source 14 is attached to holder 28.

A direct relationship exists between the flow of bulk material through the hose and the detector and changes in the intensity of light impinging on the sensor. These changes produce a varying voltage at the output of the sensor. The sensor's output voltage is directed to an analog-to-digital converter 30 which samples and digitizes the cell's analog output voltage. A sampling rate of one thousand (1000) times per second is suitable. The digitized data produced by the samplings is accumulated in a computer memory 32 and is representative of the amplitude of the voltage levels at the sensor's output.

Through experimentation utilizing the apparatus just described, it has been discovered that each type of insulation appropriate for installation by blowing has a distinctive constant which is directly related to its physical characteristics. This constant is determined by blowing a sample of known weight past detector 10 and accumulating in memory 32 digitized data derived from the detector's output. The constant is arrived at by dividing the accumulated data by the weight.

By repeating the experimentation just described for different insulating materials, a catalog of constants is developed, and these constants (referred to hereinafter as "constants of proportionality") are stored at appropriate identifiable locations in memory 32.

The manner in which the invention is utilized during normal operation to measure the weight of a known material which is being blown now will be described.

First, the operator informs the computer of the material's identity, utilizing the keys of a keyboard and display unit 34. This results in the memory 32 being accessed to retrieve therefrom the constant of proportionality for that material. From the time the blowing machine is turned on, the flow meter accumulates digitized data in the manner previously described, provided there is movement of the material through the detector. A software program, also retained in memory 32, instructs the computer's central processing unit 36 to solve the following equation to determine the weight of material blown:

$$\text{weight (in pounds)} = \frac{\text{accumulated digitized data}}{\text{constant of proportionality}}$$

The results of the calculation are continuoulsy displayed on the display portion of unit 34. A final printout stating the date, as well as the type and weight of the material blown, is provided by a printer 38 actuated in response to a command instituted by appropriate operation of the keyboard of unit 34.

What is claimed is:

1. Apparatus for measuring the flow of bulk solids pneumatically conveyed through a hose comprising:
    a detector including a light source and a light responsive sensing device arranged to receive a beam of light from said source, the detector being joined to the hose in such a manner that the solids pass through said light beam to vary the intensity of light impinging on said sensing device thereby changing the output voltage of said device;
    means for sampling and digitizing said output voltage;
    a memory for accumulating digitized data produced by said sampling and digitizing means, said memory also storing a constant representative of the type of solids conveyed through the hose; and
    means for computing the weight of solids passing said detector by dividing the accumulated digital data by said constant.

2. Apparatus as set forth in claim 1, wherein said sensing device is a photocell.

3. Apparatus as set forth in claim 1, wherein said sensing device employs fiber optics.

4. Apparatus as set forth in claim 1, wherein said detector comprises a tube having a central portion of substantially rectangular cross-section, said light source and the light responsive sensing device being located at said central portion on opposite sides thereof, respectively.

5. Apparatus as set forth in claim 4, wherein said sensing device is a photocell.

6. Apparatus as set forth in claim 4, wherein said sensing device employs fiber optics.

* * * * *